United States Patent
Zhang et al.

(10) Patent No.: US 11,916,972 B2
(45) Date of Patent: Feb. 27, 2024

(54) TRAFFIC CAPTURE MECHANISMS FOR INDUSTRIAL NETWORK SECURITY

(71) Applicant: Cisco Technology, Inc., San Jose, CA (US)

(72) Inventors: Lin Zhang, Apex, NC (US); Alex Wang, Cary, NC (US); Srinivas Tenneti, Morrisville, NC (US); Heather Riley Hilldale, Apex, NC (US); Erika Franco Acevedo, Apex, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 102 days.

(21) Appl. No.: 17/185,480

(22) Filed: Feb. 25, 2021

(65) Prior Publication Data
US 2022/0272129 A1  Aug. 25, 2022

(51) Int. Cl.
*H04L 9/40* (2022.01)
*H04L 43/028* (2022.01)
*H04L 12/46* (2006.01)
*H04L 12/64* (2006.01)

(52) U.S. Cl.
CPC ........ *H04L 63/306* (2013.01); *H04L 12/4641* (2013.01); *H04L 43/028* (2013.01); *H04L 2012/6437* (2013.01); *H04L 2012/6454* (2013.01)

(58) Field of Classification Search
CPC . H04L 63/306; H04L 12/4641; H04L 43/028; H04L 2012/6437; H04L 2012/6454
See application file for complete search history.

(56) References Cited

U.S. PATENT DOCUMENTS

| | | | |
|---|---|---|---|
| 8,885,492 B2 | 11/2014 | De Silva | |
| 9,455,935 B2 | 9/2016 | Yu et al. | |
| 9,565,118 B1* | 2/2017 | Pannell | H04L 47/2458 |
| 10,693,671 B2* | 6/2020 | Levy-Abegnoli | H04L 12/185 |
| 2006/0039388 A1* | 2/2006 | Shur | H04L 12/185 |
| | | | 370/432 |
| 2006/0062187 A1* | 3/2006 | Rune | H04L 63/1441 |
| | | | 370/338 |

(Continued)

FOREIGN PATENT DOCUMENTS

WO   2018208295   11/2018

OTHER PUBLICATIONS

Montero et al., "Cross-Site Virtual Network in Cloud and Fog Computing", IEEE CLouid Computing , vol. 4, Issue 2), Apr. 2017.*

(Continued)

*Primary Examiner* — Todd L Barker
(74) *Attorney, Agent, or Firm* — BEHMKE INNOVATION GROUP LLC; James M. Behmke; James J. Wong

(57) ABSTRACT

According to various embodiments, a networking device in a network receives traffic from the network. The networking device duplicates the traffic into a duplicate traffic copy. The networking device encapsulates the duplicate traffic copy into a multicast frame. The networking device sends, via a multicast address, the multicast frame to a network sensor in the network for analysis, wherein the multicast address is reserved in the network for traffic analysis.

16 Claims, 6 Drawing Sheets

(56) References Cited

U.S. PATENT DOCUMENTS

| | | | | |
|---|---|---|---|---|
| 2012/0259821 | A1* | 10/2012 | Alam | H04L 67/288 |
| | | | | 707/E17.005 |
| 2014/0172994 | A1* | 6/2014 | Raumann | H04L 51/23 |
| | | | | 709/206 |
| 2016/0359872 | A1* | 12/2016 | Yadav | H04L 63/20 |
| 2017/0331746 | A1* | 11/2017 | Qiang | H04L 67/566 |
| 2019/0141099 | A1 | 5/2019 | Manohar et al. | |
| 2019/0289022 | A1* | 9/2019 | Thubert | H04L 47/32 |
| 2020/0287737 | A1 | 9/2020 | Mishra et al. | |

OTHER PUBLICATIONS

Stojmenovic et al., Fog Computgin: A cloud to the groud support for smart things and machine to machine networks, 2014 Australasian Telecommunication Networks and Applicatoins Conference (ATNAC), Nov. 26, 2014.*

Brockelsby et al., "A Graded Approach to Network Forensics with Privacy Concerns", 2019 Workshop on Computing, Network and COmmunications (CN(C(, Feb. 18, 2019.*

Boujelben et al., "Enhancement and Performance Evaluatin of a Multicast Routing Mechanism in ZigBee Clusteer-tree Wireless Sensor Networks", 2013 10th International Multi-Conference on Systems, Signals & Devices, Mar. 18-21, 2013.*

Nasrallah et al., "Ultra_-Low Latency (ULL) NetworksL the IEEE TSN and IETF DetNet standards and Related 5G ULL Research", IEEE Communications Surveys & Tutorials, vol. 21,No. 1, First Wuarter 2019.*

Kernen et al., "Optimised IP Multicast Architectures for Real-Time Digital Workflows", 2012 Annual Technical Conference & Exhibition, Oct. 23, 2012.*

"Configuring SPAN and RSPAN", Catalyst 2960 Switch Software Configuration Guide, Chapter 23, Nov. 10, 2020, 22 pages, Cisco Systems, Inc.

"Purdue Enterprise Reference Architecture", online: https://en.wikipedia.org/wiki/Purdue_Enterprise_Reference_Architecture, Apr. 14, 2020, 2 pages, Wikimedia Foundation, Inc.

Shirkar, Ashish, "Understanding Span, RSPAN, and ERSPAN", Cisco Community, Mar. 1, 2019, 16 pages, Cisco Systems, Inc.

* cited by examiner

TRAFFIC CAPTURE MECHANISMS FOR INDUSTRIAL NETWORK SECURITY

TECHNICAL FIELD

The present disclosure relates generally to computer networks, and, more particularly, to traffic capture mechanisms for network security.

BACKGROUND

Operational Technology (OT)/industrial networks are typically used to automate processes, such as factories, buildings, utilities, transportation systems, and the like. Accordingly, the device the network (e.g., controllers, robots, input/output devices, actuators, etc.) often require reliable communications so that their underlying processes are not interrupted. To this end, many OT/industrial networks employ mechanisms that provide redundancy such as ring topologies, Parallel Redundancy Protocol (PRP), redundant star, etc.

Traditionally, security in OT/industrial networks has relied primarily on the Switch Port Analyzer (SPAN) protocol and its extensions to forward network traffic to a specified traffic analyzer. In turn, the traffic analyzer may perform deep packet inspection (DPI) or other analytics, to discern the security posture of the traffic. In turn, the traffic analyzer may initiate corrective measures, if the traffic is suspected of being malicious or in violation of a security policy.

While SPAN-based security mechanisms are fairly ubiquitous in OT/industrial networks, they are not without cost, as they also increase the bandwidth consumption in the network. For large ring topologies, in particular, this can lead to an additional bandwidth overhead that increases exponentially with the size of the ring. Consequently, the additional bandwidth overhead caused by the security mechanism can result in the controlled process becoming disrupted, security risks going unanalyzed, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
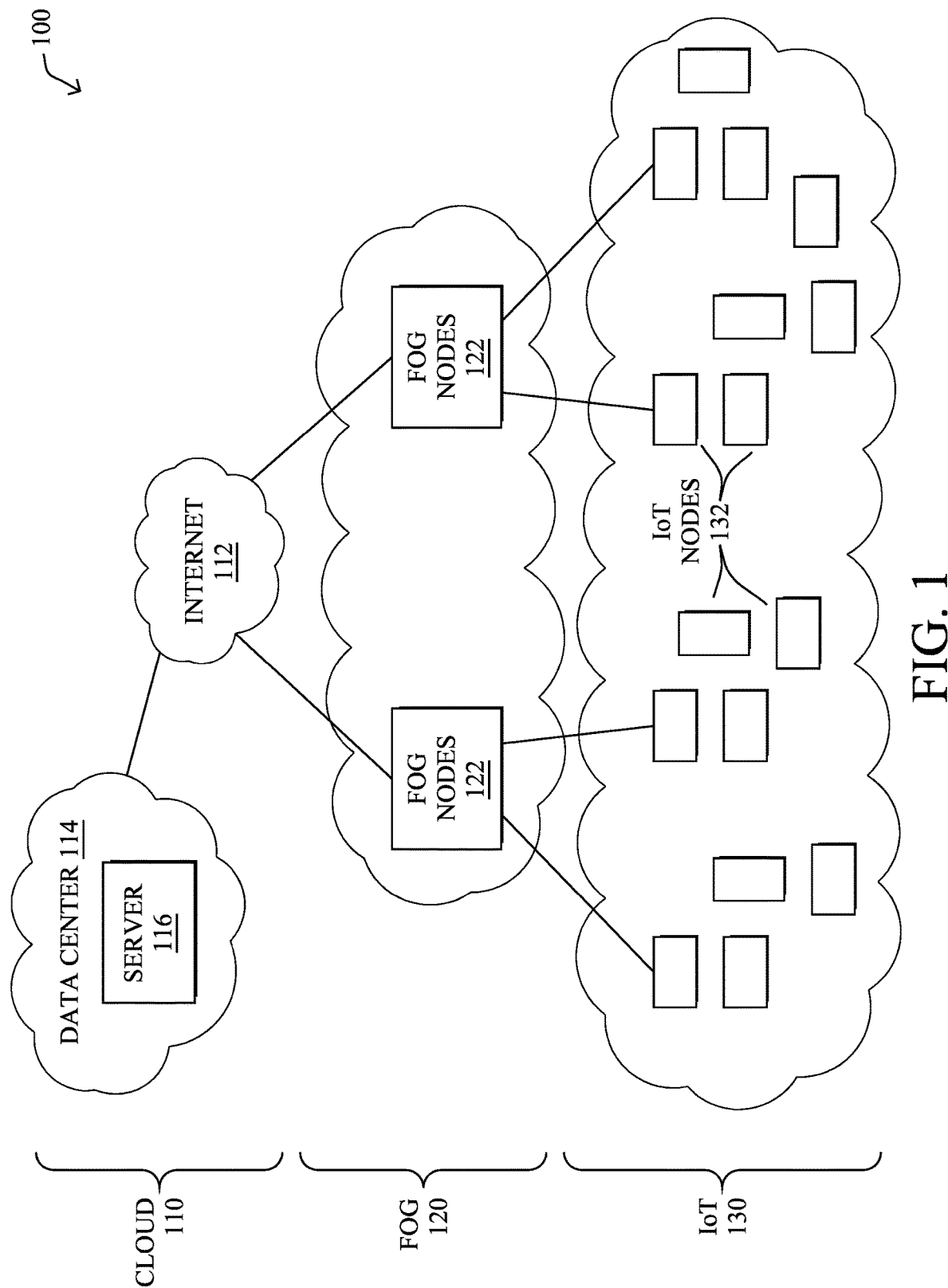
FIG. 1 illustrates an example network.

According to one or more embodiments of the disclosure, a networking device in a network receives traffic from the network. The networking device duplicates the traffic into a duplicate traffic copy. The networking device encapsulates the duplicate traffic copy into a multicast frame. The networking device sends, via a multicast address, the multicast frame to a network sensor in the network for analysis, wherein the multicast address is reserved in the network for traffic analysis.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
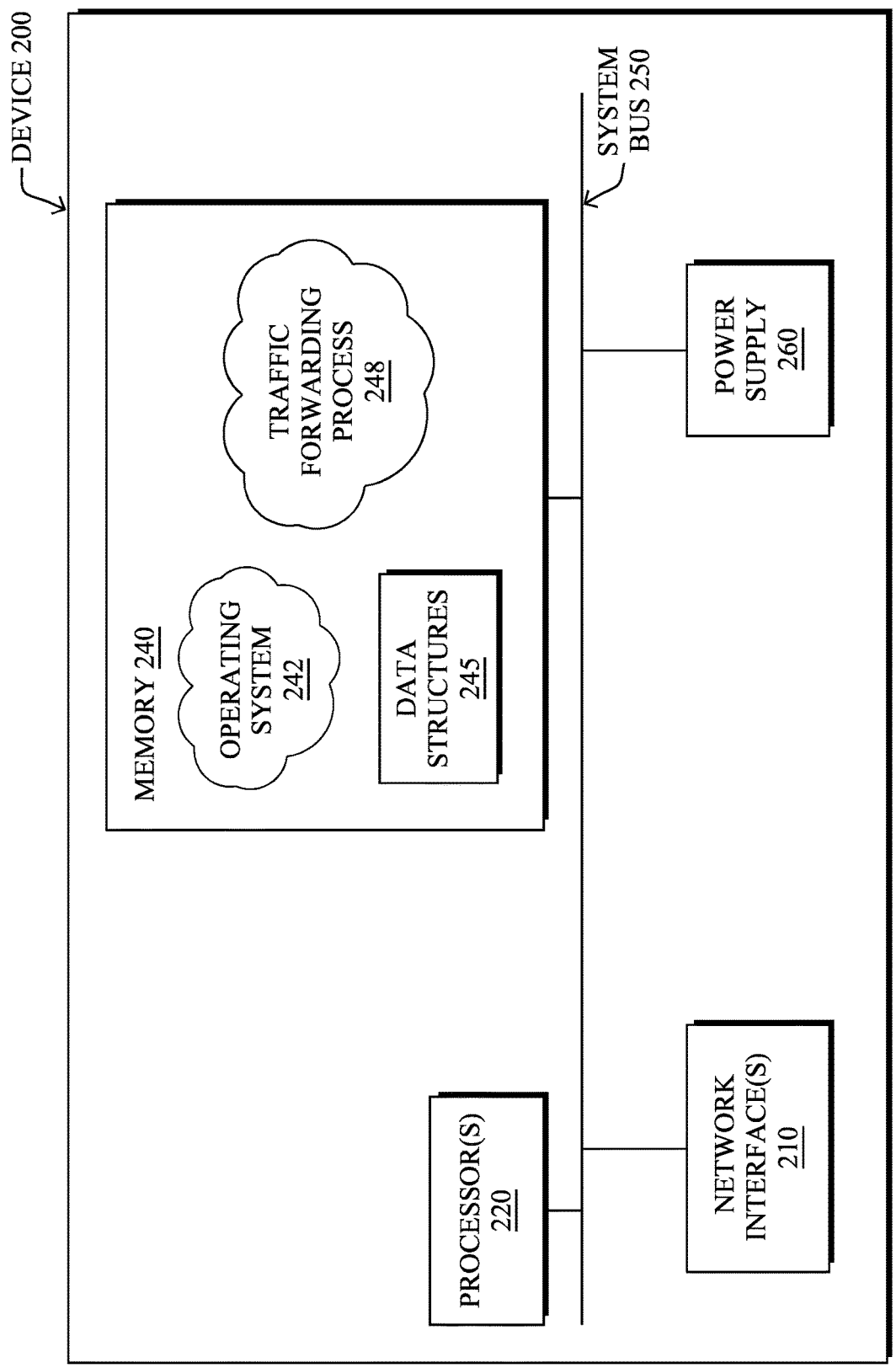
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as an access point (AP), AP controller, switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic forwarding process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
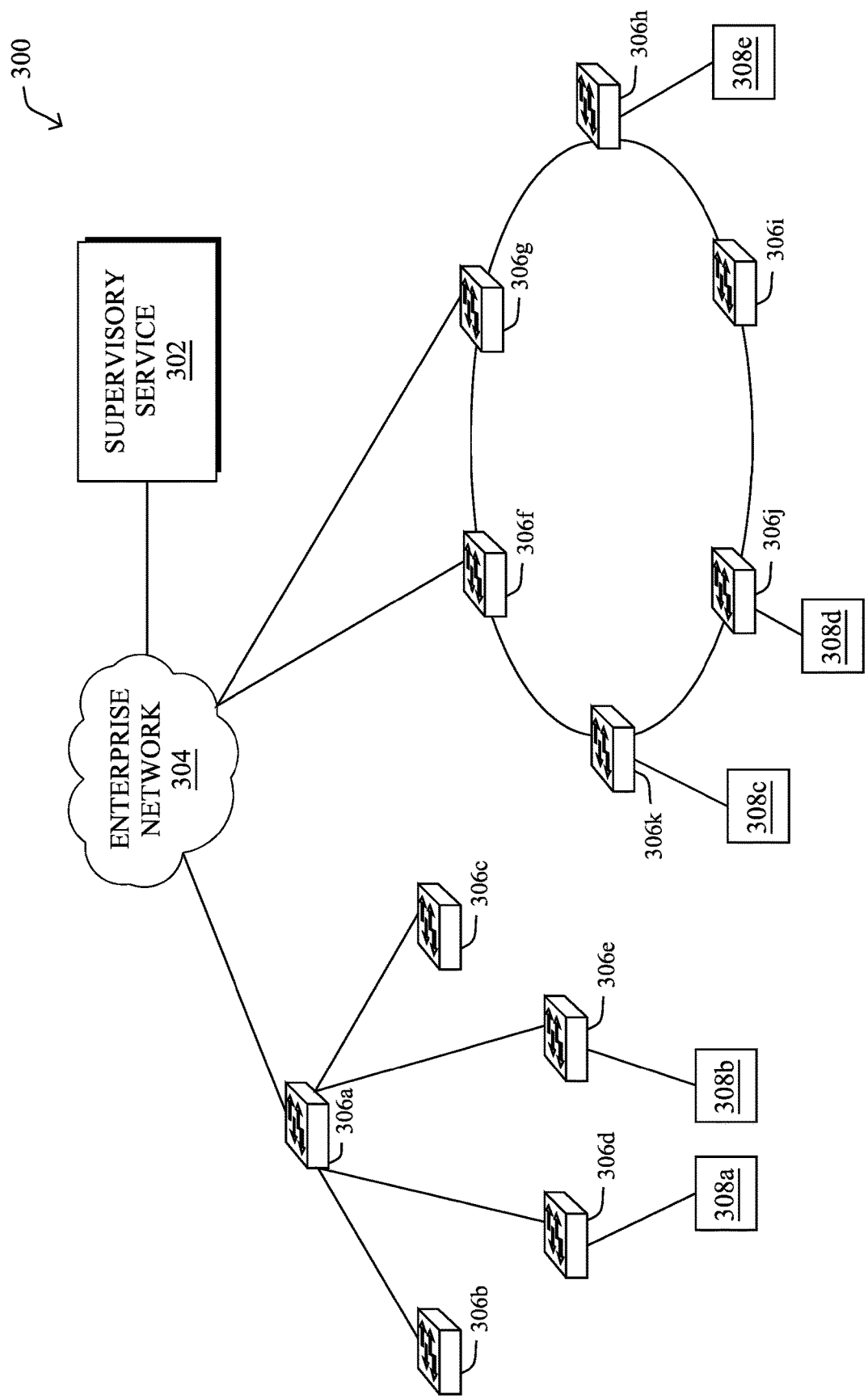
FIG. 3 illustrates an example industrial network.

FIG. 3 illustrates an example Operations Technology (OT)/industrial network 300, according to various embodiments. As shown, network 300 may comprise any number of networking devices 306, such as networking devices 306a-306k (e.g., Ethernet switches, etc.), which provide connectivity between endpoints 308, such as 308a-308e, and an enterprise network 304. For instance, endpoints 308a-308e may take the form of sensors, actuators, moving nodes (e.g., vehicles, mine carts, drones, etc.), human-machine-interfaces, controllers (e.g., programmable logic controllers, etc.), input/output (I/O) devices, or the like.

As would be appreciated, OT/industrial networks are typically organized in a hierarchical manner, according to the Purdue model. At the lowest levels of the model (e.g., levels 0-2) are the devices that directly implement the industrial process (e.g., a printing press, a stamping machine, a programmable logic controller, etc.). Often, devices at these levels are grouped into sub-groups by their physical locations, such as into cell/area zones. At the higher levels of the model are the devices that oversee the operations of the network from the plant/site level. For instance, networking devices 306 and endpoints 308 may form levels 0-2 of the Purdue model, while supervisory service 302 may fall within level 3 of the model (e.g., hosted in a control room, as a cloud service, etc.).

Various network topologies are also commonly found in OT/industrial networks. For instance, many OT/industrial networks include redundant star topologies, Parallel Redundancy Protocol (PRP)-based topologies, and/or ring topologies. In general, these types of topologies function to provide network redundancy to the endpoints of the network. Thus, if a particular link in the network fails, the industrial process can continue to function in an uninterrupted manner.

For instance, as shown, networking devices 306a-306e may be arranged in a redundant star topology, with networking device 306a providing external connectivity to the other networking devices 306b-306e in the cell/zone.

As another example, networking devices 306f-306k may be arranged in a ring topology. Typically, a network ring may make use of a ring-control protocol such as the Spanning Tree Protocol (STP), Resilient Ethernet Protocol (REP), or the like. Networking devices 306f-306k may use REP, for instance, to handle link failure and ensure quick network convergence, through the control over their ports. More specifically, under REP, at least one port of a networking device may be designated as an alternate port and placed into a blocked state for each Virtual LAN (VLAN). When a link failure is detected, the alternate port can be activated, thereby ensuring connectivity. REP also provides for very fast convergence recovery times and is able to support convergence times of up to approximately 50 ms.

As would be appreciated, OT/industrial networks can typically handle a limited amount of traffic for critical operations. However, there is also a need to monitor the network, both from a physical standpoint, as well as from a security standpoint. In ring topologies, in particular, this can lead to an exponential growth in the amount of traffic associated with this monitoring.

In various embodiments, network 300 may also include a supervisory service 302 that provides supervisory control over the networking devices in network 300, such as 306a-306k. An example of such a supervisory service is Cisco Digital Network Architecture (Cisco DNA) by Cisco Systems, Inc. Such supervisory function may include, for example, any or all of the following, among others:

Device Onboarding—here, supervisory service 302 may be responsible for overseeing the onboarding of any new devices to the network, such as assigning them to security groups, cataloging the new device, etc.

Implementing Security Policies—supervisory service 302 may also be responsible for specifying security policies for network 300, such as by preventing a certain endpoint from communicating with another endpoint, etc.

Network Monitoring—supervisory service 302 may also receive telemetry data collected from network 300, allowing supervisory service 302 to assess and report on the health of network 300.

Device Configuration—supervisory service 302 may also configure the networking devices in network 300, such as by pushing software updates to networking devices 306a-306k, In other words, supervisory service 302 may supervise any or all of the various functions of network 300.

As noted above, network security is paramount in OT/industrial networks. Indeed, there have been many attacks targeted towards industrial assets, taking advantage of vulnerabilities present in the devices. For example, many industrial devices within a process control loop communicate using Layer 2. An infected device could reach and infect other devices in the process control, given they are all on the same broadcast domain. Thus, security measures are required to help prevent and mitigate these types of incidents.

Unfortunately, the traditional monitoring methods used in enterprise networks are not always transferable to the industrial network architecture. Enterprise networks have various applications and methods to gain visibility of devices, profile them, monitor traffic flows, and apply access control. In many instances, a centralized tool uses several protocols such as the Link Layer Discovery Protocol (LLDP), Simple Network Management Protocol (SNMP), Cisco Discovery Protocol (CDP), Dynamic Host Configuration Protocol (DHCP), HyperText Transfer Protocol (HTTP), NetFlow, etc., to scan and gain visibility of all the devices in the network. While these methods are essential to security monitoring in any environment, many of the industrial automation devices don't support these probes, so enterprise tools are not useful in tracking Industrial Automation and Control System (IACS) devices. Moreover, active scanning of IACS devices may interfere with real-time control data communication.

To address the security needs of IACS devices, deep packet inspection (DPI) is often used to analyze the contents of packets and learn the attributes of the IACS devices, communications, and behaviors. This information can then be shared with enterprise security management, which can be used to help secure the devices and the networks on which they communicate. The addition of an industrial cybersecurity tool in the network has helped to bridge the security gap for the industrial devices.

In order for the industrial cybersecurity tool to perform deep packet inspection, Switch Port Analyzer (SPAN) and remote SPAN (RSPAN) are often used to passively deliver all traffic flowing through a networking device to the network sensor for inspection. In general, such network sensors fall into two categories: hardware-based sensors and software-based sensors. For a software-based sensor, there is a special type of SPAN that replicates the traffic into the sensor application within the switch itself. However, for a hardware-based sensor, all the networking devices must export their SPAN traffic to the hardware sensor, externally. Even though the ideal situation is to upgrade all of the networking infrastructure to support software-based sensors, this is often not feasible for the following reasons:

1) Brownfield deployment: The network operator currently has a large investment in the existing hardware of the network, and it is not practical to upgrade the network with the latest hardware.
2) Feature gap: The network operator may require the use of a specific networking device to address a need, and that device may not support the ability to host a software-based sensor.
3) Multi-vendor environment: In other instances, the network operator may have invested in third-party security monitoring products. This can lead to difficulties in conveying captured traffic to these products for analysis.

Regardless of the reason for using a hardware-based network sensor, relying on SPAN to convey captured traffic to the hardware-based sensor results in high bandwidth consumption. This is because SPAN traffic through a network ring grows exponentially as it appends duplicates through each adjacent node. The duplication of traffic can disrupt the production network traffic, negatively impacting the industrial devices and their critical communications. In addition, not only are the devices and their routine communications disrupted, but security tools used to monitor these devices lose visibility when the network becomes overloaded, leaving the network unguarded.

By way of example, consider the case of a ring comprising 16 nodes and IACS traffic of 1 Mbps. Conveying this traffic through all 16 nodes in the ring to reach the network sensor will result in a bandwidth consumption of $2^{15}=32$ Gbps. This is a tremendous consumption of available bandwidth for the control network, and will likely lead to traffic being dropped. Most of Layer 2 industrial cell zones provide a transport speed of 100 Mbs to 1 Gbs transport speed as a common configuration. Thus, a new mechanism to convey traffic for analysis by a hardware-based network sensor is needed to support these and other situations.

Traffic Capture Mechanism for Industrial Network Security

The techniques herein introduce a traffic capture and conveyance mechanism that relies on the use of multicast encapsulation, to convey the captured traffic to the network sensor for analysis. By using multicast instead of traditional SPAN, intermediary devices between the source networking device and the network sensor may simply forward the multicast traffic via their uplink ports, thereby preventing an explosive growth of bandwidth consumption as the number of intermediary devices grows.

Illustratively, the techniques described herein may be performed by hardware, software, and/or firmware, such as in accordance with traffic forwarding process 248, which may include computer executable instructions executed by the processor 220 (or independent processor of interfaces 210) to perform functions relating to the techniques described herein.

Specifically, according to various embodiments, a networking device in a network receives traffic from the network. The networking device duplicates the traffic into a duplicate traffic copy. The networking device encapsulates the duplicate traffic copy into a multicast frame. The networking device sends, via a multicast address, the multicast frame to a network sensor in the network for analysis, wherein the multicast address is reserved in the network for traffic analysis.

Figure 4:
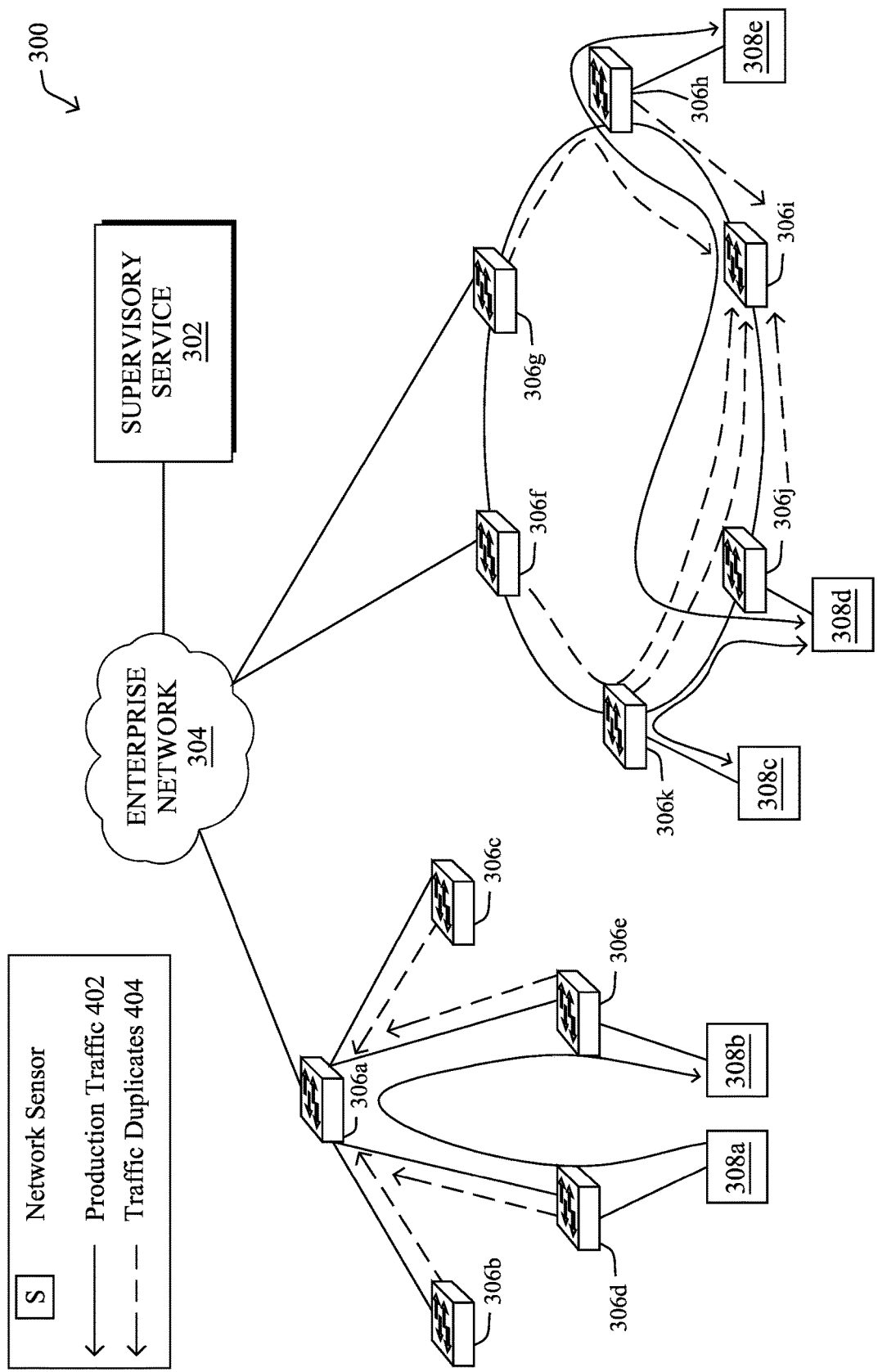
FIG. 4 illustrates an example of sending industrial network traffic to network sensors.

Operationally, FIG. 4 illustrates an example of sending industrial network traffic to network sensors, according to various embodiments. Continuing the example of FIG. 3, again consider network 300. In the example shown, now assume that certain networking devices 306 in network 300 are network sensors. For instance, assume that networking device 306a and networking device 306i are hardware-based network sensors in their respective zones of network 300. In such a case, networking device 306a and networking device 306i may be configured to perform deep packet inspection (DPI) and/or other traffic analysis approach, to learn the characteristics of the various endpoints 308 in network 300.

Based on the learned characteristics of a particular endpoint 308, various policies may be applied to that device, either directly by the network sensor and/or in conjunction with supervisory service 302. For instance, if networking device 306a determine that the traffic sent by endpoint 308a to endpoint 308b represents a security threat, networking device 306a may initiate corrective measures such as blocking that traffic, sending an alert to a security expert, or the like.

According to various embodiments, the techniques herein introduce a new mechanism to convey traffic duplicates 404 of production traffic 402 to network sensors for analysis, which is referred to herein as "multicast-SPAN." Such a mechanism may be used to convey traffic duplicates 404 to any or all of the following:

A network sensor deployed within a cell/area zone—in this case, the traffic flows that are happening in the cell are copied for monitoring and sent to the network sensor in a single stream of traffic.

A network sensor deployed in the distribution switch—in this instance, all of the production traffic flows happening in the cell/area zone may be copied and sent to the network sensor deployed in the distribution switch in a single stream of traffic.

A network sensor deployed in the data center—in this case, all of the traffic flows happening in the cell/area zone may be copied into a single stream and sent to a network sensor deployed in the data center (e.g., the hosting location of supervisory service 302).

As a preliminary step, in various embodiments, a dedicated multicast address may be established and associated with the destination network sensor of the copied traffic. Thus, when a networking device duplicates production traffic for analysis, it may send this duplicated traffic to the network sensor via the multicast address.

By way of example, consider the case in which production traffic 402 flows from endpoint 308c to endpoint 308d and through networking device 306k. In such a case, networking device 306k may duplicate this production traffic 402, thereby forming traffic duplicates 404, and send the traffic duplicates 404 onward to networking device 406i, which is the network sensor for the local ring, and addressed to a multicast address associated with the network sensor.

In various embodiments, any intermediate networking devices between the sending networking device and the network sensor may be excluded from the multicast group address associated with the network sensor. As a result, any such intermediate device receiving the multicast, traffic duplicates 404 will simply forward the monitored traffic on their outgoing/uplink ports (i.e., the traffic duplicates 404 will not be forwarded via their access ports). As would be appreciated, this forwarding operation has minimal overhead on the part of the intermediary device, as these types of forwarding operations are typically performed by switches in hardware using specialized application-specific integrated circuits (ASICs). In addition, in contrast to traditional SPAN-based approaches, there is also no additional growth in bandwidth consumption with each hop, as the intermediary device simply forwards on the traffic duplicates and does not add any additional data to it.

To further ensure that the sending of traffic duplicates 404 to network sensors for analysis does not impinge upon production traffic 402, the network may also employ further mechanisms that distinguish between these two types of traffic. For instance, in one embodiment, different Quality of Service (QoS) policies may be assigned to production traffic 402 and traffic duplicates 404, so as to give priority to production traffic 402. Doing so may help to avoid the sending of traffic duplicates 404 for analysis from consuming too much bandwidth and affecting production traffic 402. Of course, the opposite prioritization could also be implemented, as desired. In a further embodiment, traffic duplicates 404 could also be sent via a dedicated virtual LAN (VLAN), thereby segmenting the traffic duplicates 404 from that of production traffic 402.

Figure 5:
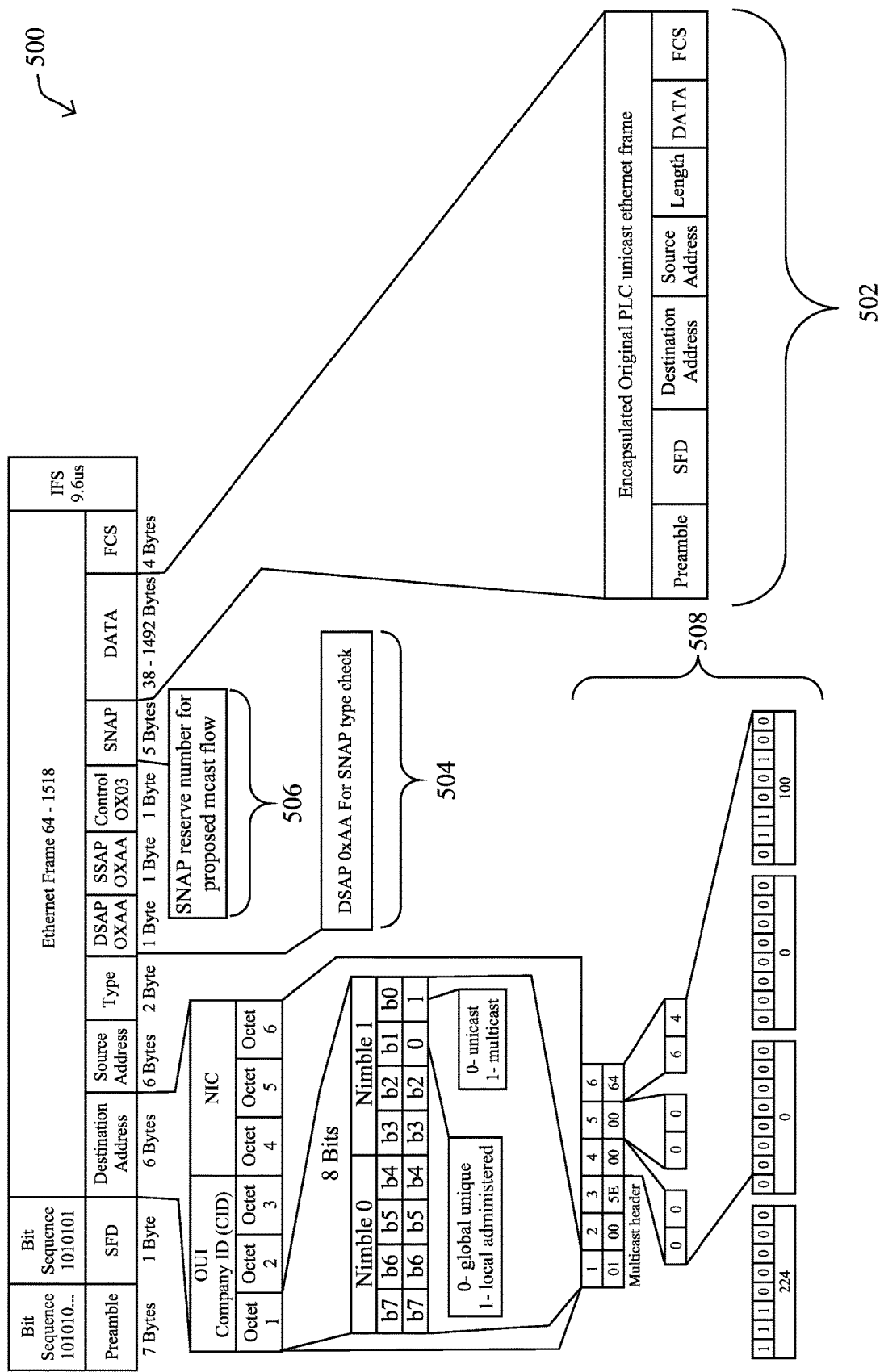
FIG. 5 illustrates an example of the encapsulation of industrial network traffic for analysis.

According to various embodiments, the sending networking device may encapsulate the duplicated traffic into a multicast frame, such as the multicast frame 500 shown in FIG. 5. As shown, multicast frame 500 may take the form of an Ethernet frame that encapsulates the duplicate of the production traffic captured by the networking device sending multicast frame 500 to the network sensor for analysis. For instance, assume that an Ethernet switch captures a unicast Ethernet frame 504 sent by a programmable logic controller (PLC) in the network. In such a case, the switch may encapsulate the duplicated frame 502 within multicast frame 500 (e.g., in the payload data field of frame 500 or in another suitable field).

As shown, the networking device generating multicast frame 500 may also insert the multicast address 506 associated with the network sensor that is to assess the encapsulated, duplicated frame 502 into the header of multicast frame 500. Typically, this is a multicast address designated specifically for security monitoring, which will not interfere with the normal multicast traffic in the network. Since this multicast address is being used in multicast frame 500, intermediate switches will simply forward multicast frame 500 on to the network sensor via their uplink ports.

Multicast frame 500 may also include any or all of the following characteristics:
- The DSAP field 504 is set to a value of 0xAA, to indicate a SNAP field check for classifying the proposed multicast traffic flow with optimized procedures.
- The SNAP field 506 is set to a value in the unassigned range of the SNAP protocol, i.e., in the range of (0067-65534).
- The destination multicast group address 508 may be set to a value of a well-known multicast group address, such as 224.0.0.100, which can help to limit low-end Internet Group Management Protocol (IGMP) snooping. The advantage of using a reserved address is the switch will forward the multicast traffic only on the uplink ports that will prevent the traffic from being forwarded to the access ports.

After multicast frame 500 is sent, the destination device subscribed to the multicast group may receive multicast frame 500 and decapsulate frame 502 for analysis by the network sensor. For instance, the network sensor may perform DPI on duplicated frame 502, to make a security assessment with respect to it and its sending PLC. If this analysis indicates a security threat, corrective measures may be initiated in the network, such as by blocking traffic from the sending PLC, alerting a security expert, etc. Note also that the analysis by the network sensor can also be used for other purposes as well, such as identification of the sending device. For instance, by analyzing frame 502, the network sensor may determine that the sending device is a PLC and assign a traffic QoS policy, network segmentation policy, or the like, to it, accordingly.

Figure 6:
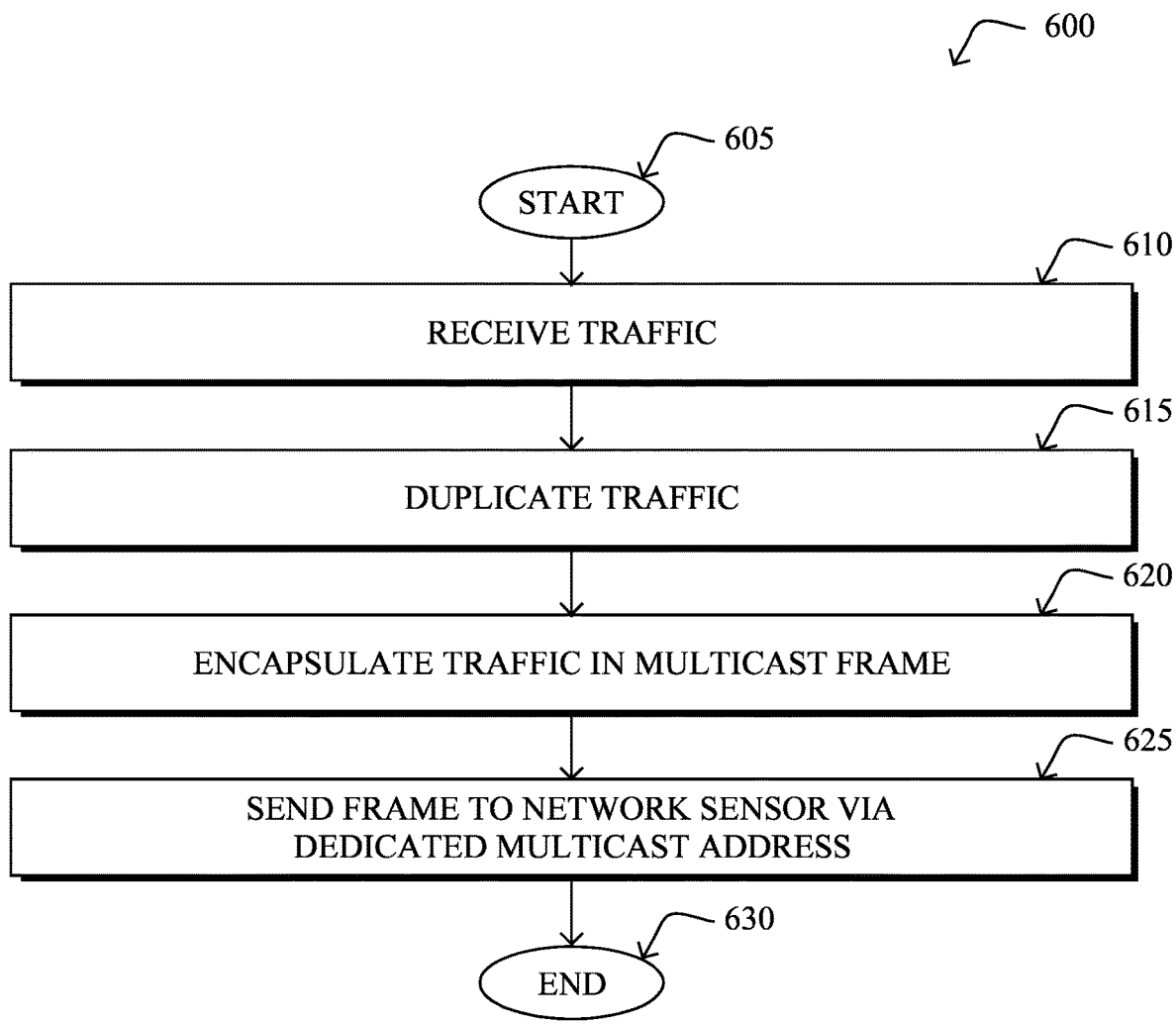
FIG. 6 illustrates an example simplified procedure for sending network traffic for analysis.

FIG. 6 illustrates an example simplified procedure sending network traffic for analysis, in accordance with one or more embodiments described herein. In various embodiments, a non-generic, specifically configured networking device (e.g., a device 200) may perform procedure 600 by executing stored instructions (e.g., traffic forwarding process 248). For instance, a particular networking device, such as an Ethernet switch, may perform procedure 600. The procedure 600 may start at step 605, and continues to step 610, where, as described in greater detail above, the networking device receives traffic from the network. In general, the traffic may be production traffic that is generated and sent by a controller, actuator, industrial sensor, or other device associated with an industrial or other network-controlled process.

At step 615, as detailed above, the networking device may duplicate the traffic into a duplicate traffic copy. Once the networking device has duplicated the traffic, the networking device may also send the original traffic onto its destination.

At step 620, the networking device may encapsulate the duplicate traffic copy into a multicast frame, as described in greater detail above. In various embodiments, the multicast frame may include a DSAP field that indicates a SNAP field check for classifying the multicast frame. In further embodiments, the SNAP field may be set to a value in the unassigned range of the SNAP protocol.

At step 625, as detailed above, the networking device may send the multicast frame to a network sensor in the network for analysis. In various embodiments, the multicast address may be reserved in the network for traffic analysis and any intermediate devices between the networking device and the network sensor may forward the multicast frame via their uplink ports, based on the multicast address. In addition, in various embodiments, the multicast traffic may be sent to the network sensor via a dedicated VLAN and may, in some instances, be assigned to a different QoS policy as that of the data traffic in the network, such as the original traffic that was duplicated in the multicast frame. In response to receiving the multicast frame, the network sensor may decapsulate the duplicate traffic copy and perform DPI or another traffic analysis approach on it, to make a security assessment of the traffic. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, can be implemented in topologies with legacy devices that do not support software-based network sensors, thereby eliminating the need and high cost of multiple hardware sensor. In addition, the techniques herein also consume less bandwidth than existing approaches, such as using SPAN to send the traffic for analysis. Indeed, in the worst-case scenario for a 15-node ring, a SPAN-based approach will add 32,000 times the original traffic to the network, whereas the techniques herein will only double the traffic. Additionally, the techniques herein will have very minimal performance effects on the intermediate switches, as the Layer-2 multicast frames can be forwarded using their existing ASICs.

The techniques described herein, therefore, introduce a data collection mechanism that serves as an alternative to data collection approaches such as SPAN. In contrast, the techniques herein are able to scale well with the size of the network and have negligible impact on the network bandwidth, data processing performance, and availability, which are of critical importance in industrial networks.

While there have been shown and described illustrative embodiments for collecting data for inspection in an industrial network, it is to be understood that various other adaptations and modifications may be made within the intent and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   receiving, at a networking device in a network, traffic from the network;
   duplicating, by the networking device, the traffic into a duplicate traffic copy;
   encapsulating, by the networking device, the duplicate traffic copy into a multicast frame, wherein the multicast frame is assigned a different Quality of Service (QoS) policy as that of the traffic; and
   sending, by the networking device and via a multicast address, the multicast frame to a network sensor in the network via one or more intermediate devices between the networking device and the network sensor for analysis, wherein the multicast address is reserved in the network for traffic analysis, such that the one or more intermediate devices forward the multicast frame to the network sensor using their uplink port only.

2. The method as in claim 1, wherein the networking device is an Ethernet switch.

3. The method as in claim 2, wherein the networking device is part of an Ethernet ring in the network.

4. The method as in claim 1, wherein the network sensor decapsulates the duplicate traffic copy from the multicast frame and performs deep packet inspection (DPI) on it, to make a security assessment of the traffic.

5. The method as in claim 1, wherein the multicast frame includes a Destination Service Access Point field that indicates a Subnetwork Access Protocol field.

6. The method as in claim 5, wherein a Subnetwork Access Protocol field of the multicast frame is set to a value in a Subnetwork Access Protocol unassigned range.

7. The method as in claim 1, wherein the networking device and the network sensor are at a Perdue model level that is below Level 3.

8. The method as in claim 1, wherein the multicast frame is sent to the network sensor via a dedicated virtual local area network (VLAN).

9. An apparatus, comprising:
   one or more interfaces to communicate with a ring of networking devices of a network;
   a processor coupled to the one or more interfaces and configured to execute one or more processes; and
   a memory configured to store a process that is executable by the processor, the process when executed configured to:
   receive traffic from the network;
   duplicate the traffic into a duplicate traffic copy;
   encapsulate the duplicate traffic copy into a multicast frame, wherein the multicast frame is assigned a different Quality of Service (QoS) policy as that of the traffic; and
   send, via a multicast address, the multicast frame to a network sensor in the network via one or more intermediate devices between the networking device and the network sensor for analysis, wherein the multicast address is reserved in the network for traffic analysis, such that the one or more intermediate devices forward the multicast frame to the network sensor using their uplink port only.

10. The apparatus as in claim 9, wherein the apparatus is an Ethernet switch.

11. The apparatus as in claim 9, wherein the network sensor decapsulates the duplicate traffic copy from the multicast frame and performs deep packet inspection (DPI) on it, to make a security assessment of the traffic.

12. The apparatus as in claim 9, wherein the multicast frame includes a Destination Service Access Point field that indicates a Subnetwork Access Protocol field.

13. The apparatus as in claim 12, wherein a Subnetwork Access Protocol field of the multicast frame is set to a value in a Subnetwork Access Protocol unassigned range.

14. The apparatus as in claim 9, wherein the apparatus and the network sensor are at a Perdue model level that is below Level 3.

15. The apparatus as in claim 9, wherein the multicast frame is sent to the network sensor via a dedicated virtual local area network (VLAN).

16. A tangible, non-transitory, computer-readable medium storing program instructions that cause a networking device in a network to execute a process comprising:
- receiving, at the networking device in the network, traffic from the network;
- duplicating, by the networking device, the traffic into a duplicate traffic copy;
- encapsulating, by the networking device, the duplicate traffic copy into a multicast frame wherein the multicast frame is assigned a different Quality of Service (QoS) policy as that of the traffic; and
- sending, by the networking device and via a multicast address, the multicast frame to a network sensor in the network via one or more intermediate devices between the networking device and the network sensor for analysis, wherein the multicast address is reserved in the network for traffic analysis, such that the one or more intermediate devices forward the multicast frame to the network sensor using their uplink port only.

\* \* \* \* \*